United States Patent [19]
Gaudette et al.

[11] Patent Number: 5,412,590
[45] Date of Patent: May 2, 1995

[54] APPLIANCE TEMPERATURE SENSOR HAVING NOISE FILTERING

[75] Inventors: Marvin F. Gaudette, Rockton; Bruce R. Weatherhead, Wilmette; Joseph J. Cacciatore, Westmont, all of Ill.

[73] Assignee: Eaton Corporation, Cleveland, Ohio

[21] Appl. No.: 41,369

[22] Filed: Apr. 1, 1993

[51] Int. Cl.[6] .................. G06F 15/31; G06F 15/336; G01K 1/02
[52] U.S. Cl. .................. 364/728.07; 364/724.01; 364/728.03; 364/825; 374/186
[58] Field of Search .............. 364/724.01, 724.08, 364/724.09, 728.03, 728.07, 825; 375/1, 76; 374/172, 182, 186

[56] References Cited
U.S. PATENT DOCUMENTS

| | | | |
|---|---|---|---|
| 4,455,617 | 6/1984 | Dolikian | 364/724.08 |
| 4,579,125 | 4/1986 | Strobl et al. | 128/731 |
| 4,943,974 | 7/1990 | Motamedi | 375/1 |
| 5,282,685 | 2/1994 | Koegler | 374/172 |

Primary Examiner—Roy N. Envall, Jr.
Assistant Examiner—Chuong D. Ngo
Attorney, Agent, or Firm—Charles H. Grace; Roger A. Johnston

[57] ABSTRACT

An appliance temperature sensor for acquisition of usable data in a noisy environment collects a plurality of temperature readings in a buffer. It then screens that batch of data to determine whether or not its noise content is acceptably low before forwarding the data to a memory for use in subsequent appliance operations. Screening consists of computing the arithmetic mean and the variance of the readings of the batch at hand. If the variance is less than a predetermined threshold level, the mean of that batch of temperature data is forwarded to the memory for subsequent use. If the variance exceeds that predetermined threshold level, the data are expunged and not used. When the number of rejected contiguous batches of data exceeds a predetermined number, an alarm is provided to alert an operator that the system is noisy.

10 Claims, 2 Drawing Sheets

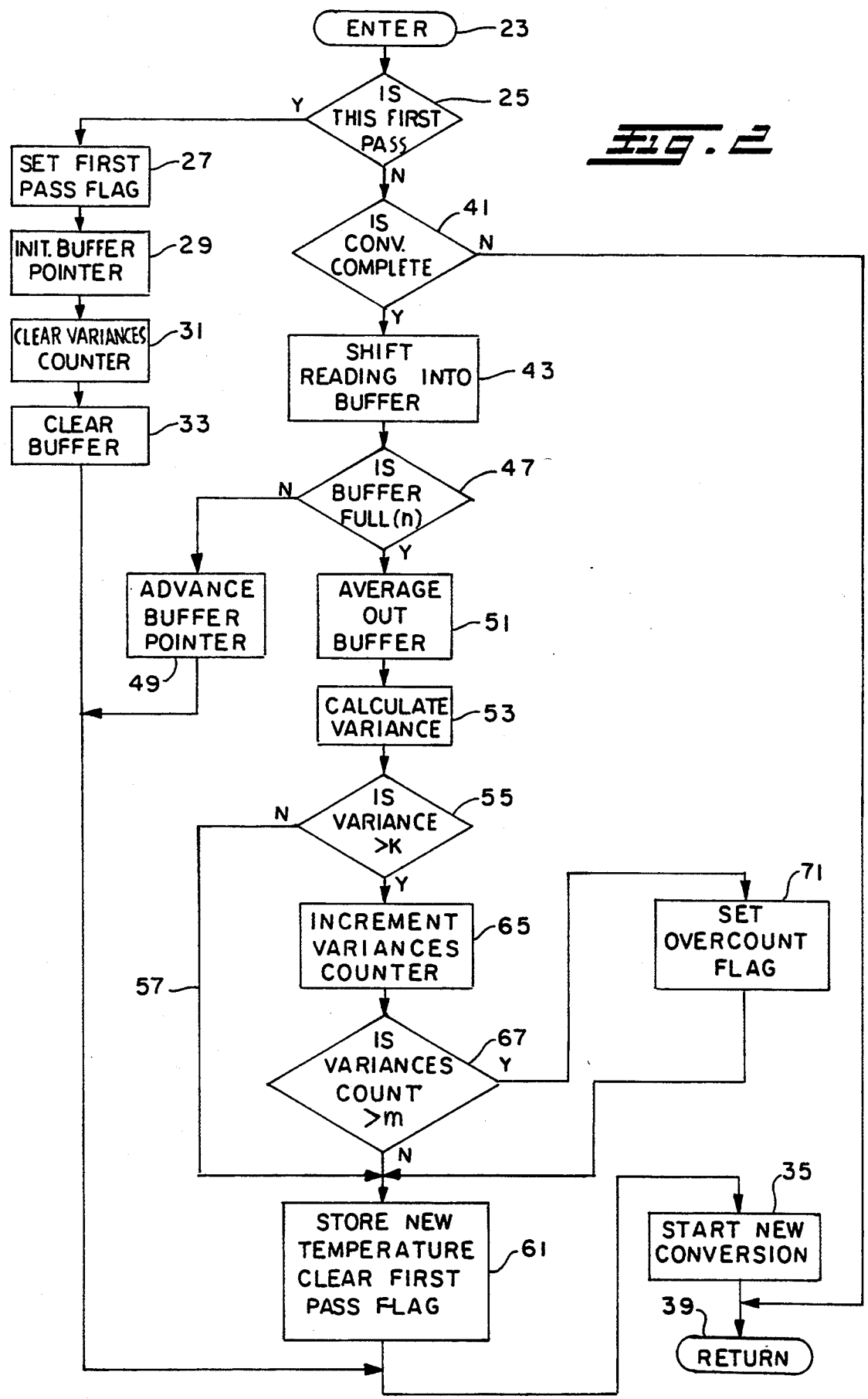

APPLIANCE TEMPERATURE SENSOR HAVING NOISE FILTERING

FIELD

The invention relates to appliance temperature sensing apparatus for acquiring and processing temperature data corrupted by noise.

SUMMARY

One object of the invention is to provide an apparatus for use in an appliance for providing temperature data to a digital processing system in the presence of noise when the data are sufficiently free of noise to be reliable, and to reject the data when it is corrupted by excessive noise. The data are screened for acceptably low noise content before they are stored for use in subsequent operations. The screening is performed by first collecting a plurality (batch) of temperature readings, and computing their arithmetic mean and variance. A batch is rejected if its variance exceeds a predetermined threshold and accepted otherwise. In one embodiment, if a predetermined number of batches is rejected because of excessive noise, an operator is alerted by means of a visible or audible alarm.

BRIEF DESCRIPTION OF DRAWINGS

FIG. 2 is a flow chart of a computer program used for practicing the invention.

DESCRIPTION OF PREFERRED EMBODIMENT

Figure 1:
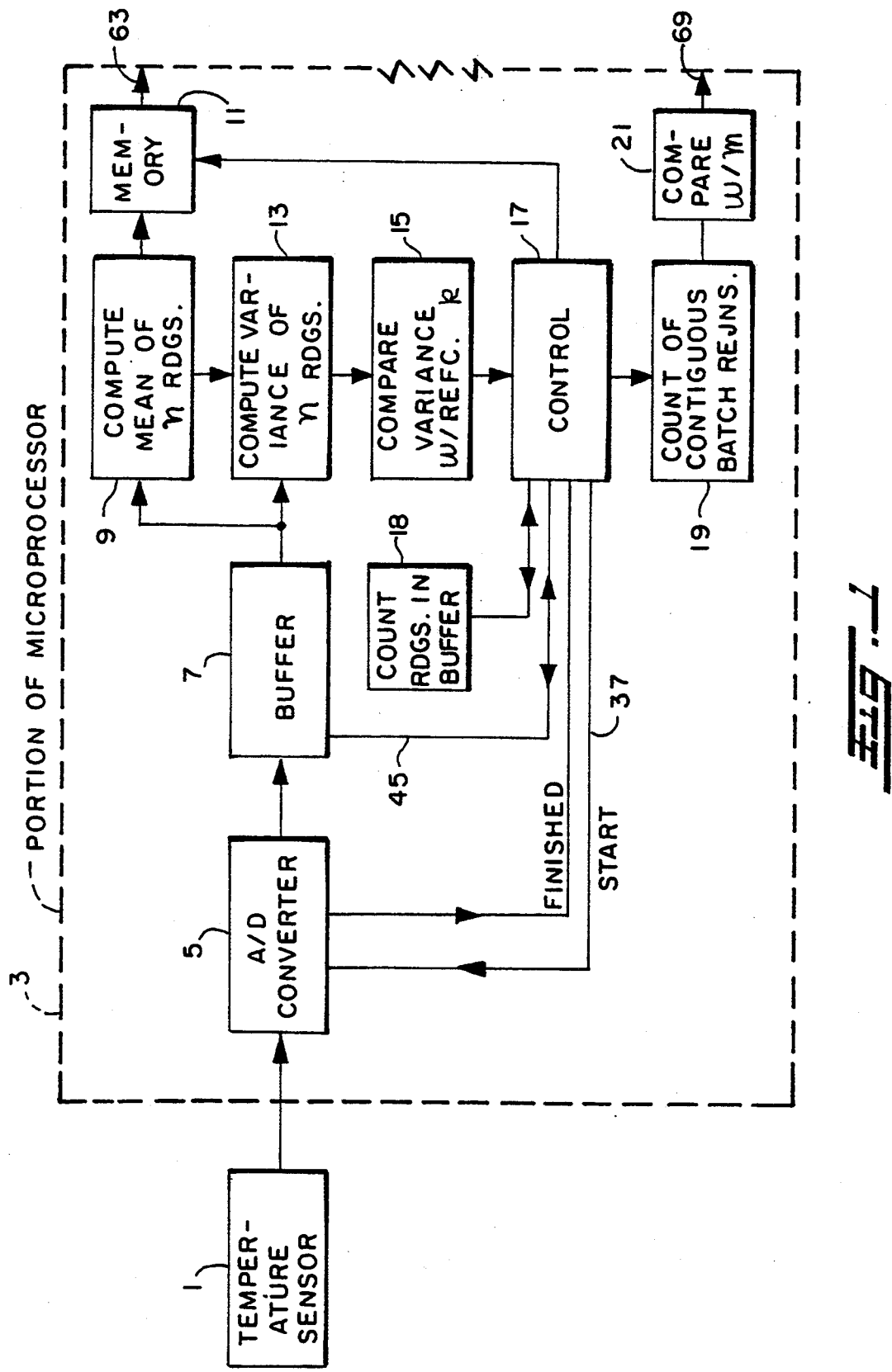
FIG. 1 is a block diagram showing functions of a preferred embodiment of the invention.

FIG. 1 shows a temperature sensor 1 whose analog signal output is connected to a portion of a microprocessor 3. In the present example, the temperature sensor continuously senses temperatures in the range of 120° to 170° F. The signals from the temperature sensor are input to an analog-to-digital (A/D) converter 5 in the microprocessor. Digital output signals from the ND converter 5 are connected to the input of a buffer 7. The output of the buffer 7 is connected to a block 9 of the computer program, whose function is to compute the mean of a batch of readings collected in the buffer. One output of the program block 9 is connected to a memory 11.

Another output of the buffer 7 is connected to a block 13 of the computer program that computes the variance of the readings that are stored in the buffer. The program block 13 receives data also from the computer program block 9, giving the mean of the batch of readings. The output of the computer program block 13 is connected to a block 15, which compares the variance of the current batch of readings with a predetermined threshold reference k.

The output of the block 15 is connected to a control block 17 of the microprocessor. Block 17 controls the operation of the ND converter 5, the buffer 7, the counting (block 18) of readings received into the buffer 7, the memory 11, etc. The control portion 17 also sends signals to a program block 19 to count the number of contiguous batches that are rejected. That count is compared in a block 21 with a predetermined number m, and a flag is set if the count of contiguous rejections exceeds m.

The operation of the invention can best be understood by simultaneous reference to FIGS. 1 and 2. The temperature sensor 1 provides continuous temperature information at its output in the form of an analog signal, which stands at the input terminals of the ND converter 5. Referring now to FIG. 2, the program of acquiring data from the temperature sensor starts at an "enter" terminal 23. In a diamond 25 of the flow chart, determination is made as to whether or not this is a "first pass" in the aggregation of a new batch of temperature readings. If it is, the first pass flag is set in a block 27 and the buffer pointer is initialized (set to the first storage location) in a block 29. Block 29 and several parts of the flow chart of FIG. 2 are included in the control block 17 of FIG. 1. Thereafter, in a block 31, the variances counter 19 is set to zero. The buffer 7 is then also cleared, by action of a block 33 of the program.

The A/D converter 5 then starts a new conversion of analog data to digital data, upon instruction of a block 35 of the program. Block 35 issues a start-conversion command to the A/D converter 5 on a line 37. The program then returns by way of a terminal 39 to the enter terminal 23 at the top of FIG. 2.

Returning again to the top of the flow chart of FIG. 2, the action again proceeds from the enter terminal 23 to the diamond 25 where it is determined this time that this is not the first pass, so the action proceeds to the diamond 41. There, a question is asked whether the conversion from analog to digital data is completed as yet. If not, the action proceeds to the bottom terminal 39, after which it re-enters the chart at the upper terminal 23. This continues until the ND conversion is complete.

When the conversion is complete, the diamond 41 passes the action to a block 43, which instructs the buffer 7 to accept a data reading from the A/D converter 5. This instruction is represented symbolically in FIG. 1 by a line 45 from the control block 17 to the buffer 7.

A test is then made in the diamond 47 as to whether or not the buffer 7 is full, which occurs when it has stored n readings of the temperature sensor by the A/D converter. In the present example, n=8 readings. If the buffer is not yet full, i.e., does not yet have 8 readings, a block 49 advances the buffer pointer and the action of the flow chart proceeds to block 35 to start a new ND conversion. The process continues in this manner until n readings have been stored in the buffer 7.

Thereafter, the diamond 47 answers that the buffer is full and the action proceeds to a block 51 where the arithmetic mean of the n readings is computed. This action corresponds to block 9 of FIG. 1. Next, a block 53 calculates the variance of the n readings that are stored in the buffer 7. Block 13 of FIG. 1 represents this function.

A diamond 55 of FIG. 2 then asks whether the variance of this particular batch of 8 readings is greater than a predetermined reference value k. The comparison of the data's variance with a reference variance k is represented by block 15 of FIG. 1. The reference value k represents the toleration threshold of noise above which the current batch of data will be rejected instead of being utilized in subsequent algorithms. The threshold level k above which noise is considered excessive is, in this example of the preferred embodiment, equal to 5. A presumption is employed here that the true temperature data changes only very slowly. Therefore, great deviations of readings from the mean of the 8 readings must be due to noise. When too much noise is present, even the mean of the 8 readings is not a reliable measure of the temperature.

Returning to block 55 of FIG. 2, if the variance is not greater than k the flow proceeds along a line 57, Next, the mean of the batch of data that has just been examined is stored, as shown in a block 61, and the first-pass flag reset. Storing of the new temperature mean is shown on FIG. 1 as a writing of the mean of 8 temperature readings from block 9 into the memory 11. That information is then available for use on a line 63 by other programs in the microprocessor 3.

Reverting back to the diamond 55, if the variance is excessive, meaning that the batch whose validity is being examined has too much noise to justify reliance upon its mean temperature value, the action proceeds to a block 65. The excessive-variances counter is incremented. The program counts the number of rejected batches of data that occur in contiguous succession. The variances counter, which is represented on FIG. 1 by block 19, counts the number of uninterrupted failures of batches. Those batches didn't pass the test of having relatively noise-free data as indicated by a low variance.

On the flow chart of FIG. 2, the action proceeds to a diamond 67, where comparison is made of the count of contiguous batch rejections with a predetermined number m. This function is represented in FIG. 1 by the comparison of the contents of the rejected-batch counter 19, in a comparator block 21, with the reference number m. When too many batches in a row are rejected, the comparator 21 outputs a signal at its output terminal 69 which results in a visual and audible warning to an operator that the process may be out of control. In the present example, m=5. Thus, if the count of excessive variances is found in diamond 67 to exceed 5, the overcount flag represented by block 71 of FIG. 2 is set.

If the variance count is not greater than 5, the process continues as described above by passing the action to block 61. The operations of blocks 61 and 35 are explained above.

The apparatus just described senses temperature in an appliance and in effect performs a low-pass-filtering function on the temperature readings. The low-pass-filtering is a consequence of the averaging performed in block 9 of FIG. 1 and block 51 of FIG. 2, that is, the extraction of the mean of 8 readings. The mean of the n readings is passed to the memory 11. If desired, of course, all n of the readings could be passed to the memory 11 for some subsequent use by the microprocessor 3.

Noisy batches of data are not passed to the memory 11, and are therefore rejected by the system. This is also a type of filtering action.

Although the invention has been described by using the preferred embodiment as an example, it will be clear to those skilled in the art that many variations are possible using the concept of the invention as defined by the claims.

We claim:

1. In apparatus for use in an appliance having a temperature sensor, wherein the temperature readings made by the sensor are corruptible by noise, the improvement comprising:
   means (5, 17) for sequentially taking a batch of said temperature readings with said temperature sensor (1);
   variance means (13) receiving said readings for determining the statistical variance of said batch of readings;
   comparator means (15) for comparing said variance with a predetermined variance reference value (k) and providing a batch-acceptance signal when said variance is less than said variance reference value and providing a batch-rejection signal when said variance is greater than said variance reference value;
   storage means (11) responsive to said batch acceptance signal for storing information regarding said batch of readings only when said variance is less than said variance reference value.

2. Apparatus as in claim 1 and further comprising:
   averaging means (9) receiving said temperature readings for determining the arithmetic mean of said batch of readings;
   said storage means (11) for storing information regarding said batch of readings comprising means for storing said arithmetic mean when said variance is less than said variance reference value.

3. Apparatus as in claim 1 and further comprising:
   counter means (19) responsive to be incremented when said batch-rejection signal occurs, for counting the number of contiguous rejections of batches;
   comparator means (21) for providing a signal (69) when the number of contiguous rejections reaches a predetermined reference number (m).

4. Apparatus as in claim 1 and wherein said source for providing readings comprises an analog-to-digital converter.

5. Apparatus as in claim 1 and wherein said means (5, 17, 18) for sequentially taking a batch of said temperature readings comprises buffer means (5) receiving said readings for temporarily storing said readings, as well as control means (17) for clearing at least (a) said buffer means, (b) said variance means (13), and (c) said counter means (19).

6. Apparatus for taking temperature readings in an appliance in which said temperature readings are corruptible by noise, comprising:
   temperature sensor means (1) for taking temperature readings at sequential times;
   buffer means (7) receiving said temperature readings for temporarily storing said readings;
   batching means (17, 18) for ascertaining when said buffer means has stored a batch consisting of a predetermined number (n) of said readings;
   means (13) for computing the statistical variance of said batch of readings;
   comparison means (15) for ascertaining whether said variance is greater than a predetermined variance reference value (k);
   control means (17) for rejecting said batch when said variance is greater than said variance reference value;
   memory means (11) for storing information regarding said batch when said variance is less than said variance reference value.

7. Apparatus as in claim 6 and further comprising:
   means (9) for computing the arithmetic mean of said batch, and wherein said memory means (11) for storing said information regarding said batch comprises means for storing said arithmetic mean when said variance is less than said variance reference value.

8. Apparatus as in claim 6 and further comprising:

counter means (19) responsive to be incremented when a rejection of a batch occurs due to excessive variance, for counting the number of contiguous rejections of batches;

comparator means (21) for providing a signal (69) when the number of contiguous rejections-reaches a predetermined reference number (m).

9. Apparatus as in claim 8 and wherein said control means (17) comprises means for clearing at least: said buffer means (7), said batching means (17, 18), said variance computer means (13), and said means (19) for counting the number of contiguous rejected batches.

10. Apparatus as in claim 6 and wherein said temperature sensor means (1) for taking temperature readings at sequential times comprises an analog-to-digital converter.

* * * * *